United States Patent Office 3,736,295
Patented May 29, 1973

3,736,295
POLYURETHANE ELASTOMERS FROM AROMATIC DIAMINES CONTAINING ETHER GROUPS
Walter Meckel, Dusseldorf, and Klaus Konig, Leverkusen, Germany, assignors to Bayer Aktiengesellschaft, Leverkusen, Germany
No Drawing. Original application Nov. 6, 1969, Ser. No. 874,684, now Patent No. 3,654,364. Divided and this application Sept. 16, 1971, Ser. No. 181,224
Claims priority, application Germany, Nov. 15, 1968, P 18 09 172.0
Int. Cl. C08g 22/16
U.S. Cl. 260—75 NH    9 Claims

ABSTRACT OF THE DISCLOSURE

Novel aromatic diamines containing ether groups and having chlorine atoms in the o-position to the amino groups are useful to prepare polyurethane elastomers therefrom with an organic diisocyanate and an organic compound containing at least two hydroxyl groups and having a molecular weight of from about 800 to about 5000.

---

This is a division of application Ser. No. 874,684, filed Nov. 6, 1969, now U.S. Pat. 3,654,364.

This invention relates to novel aromatic diamines and to elastomeric polyurethanes prepared therefrom. More particularly, this invention relates to aromatic diamines containing ether linkages and which contain chlorine atoms in the o-position with respect to the amino groups and to elastomeric polyurethanes prepared therefrom and having good tensile strength and elasticity.

Heretofore, diamines which contain ether groups and having aromatic rings between ether bridges have been known, such as, for example those having the formula

disclosed in British patent specification 1,030,026.

This invention relates to diamines containing ether groups and which have chlorine atoms in the o-position with respect to the amino groups. More particularly, this invention relates to diamines having the formula:

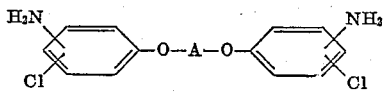

wherein the amino groups and chlorine atoms are in the o-position with respect to one another and in which A is an optionally branched carbon chain containing from 2 to 12 carbon atoms and which may be interrupted by hetero atoms, such as, for example, oxygen, sulfur, nitrogen or combinations thereof.

This invention particularly relates to diamines having the formula:

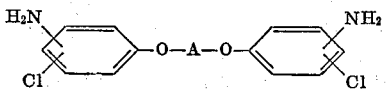

wherein A is an optionally branched carbon chain containing from 2 to 8 carbon atoms and which may be interrupted by hetero atoms. The hetero atoms may be, in particular, oxygen atoms, sulphur atoms and SO, $SO_2$ or

radicals wherein R is an alkyl radical having from 1 to 4 carbon atoms.

The carbon atoms of the carbon chain A may also be partly in the form of carbonyl or thiocarbonyl groups, preferably carbonyl groups. As examples of compounds according to the invention there may be mentioned, for example, the following compounds:

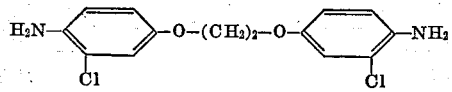

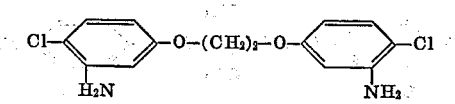

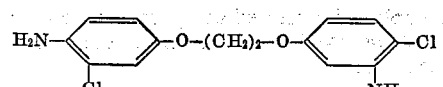

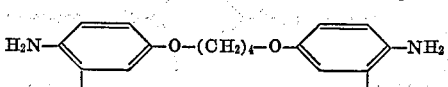

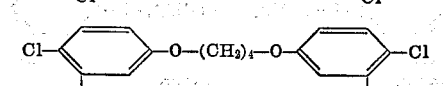

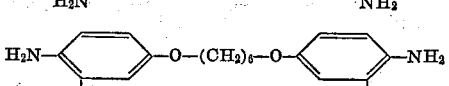

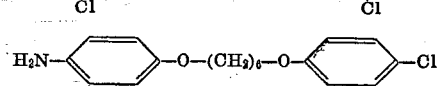

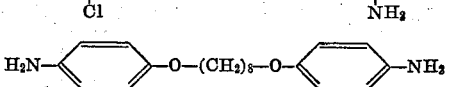

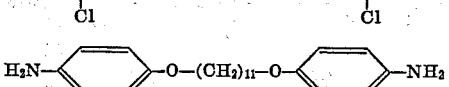

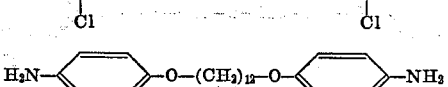

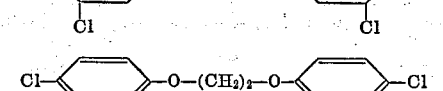

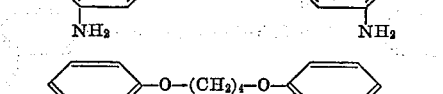

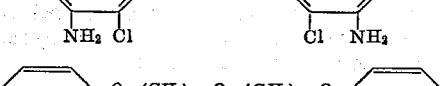

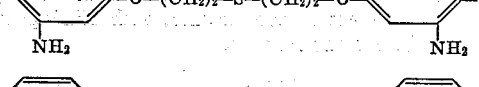

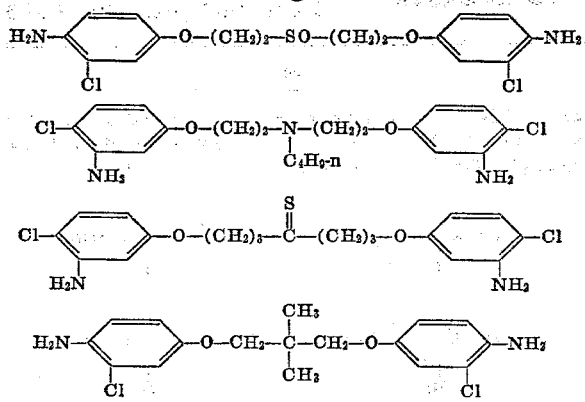

As examples of preferred compounds according to the invention there may be mentioned, for example, the following compounds:

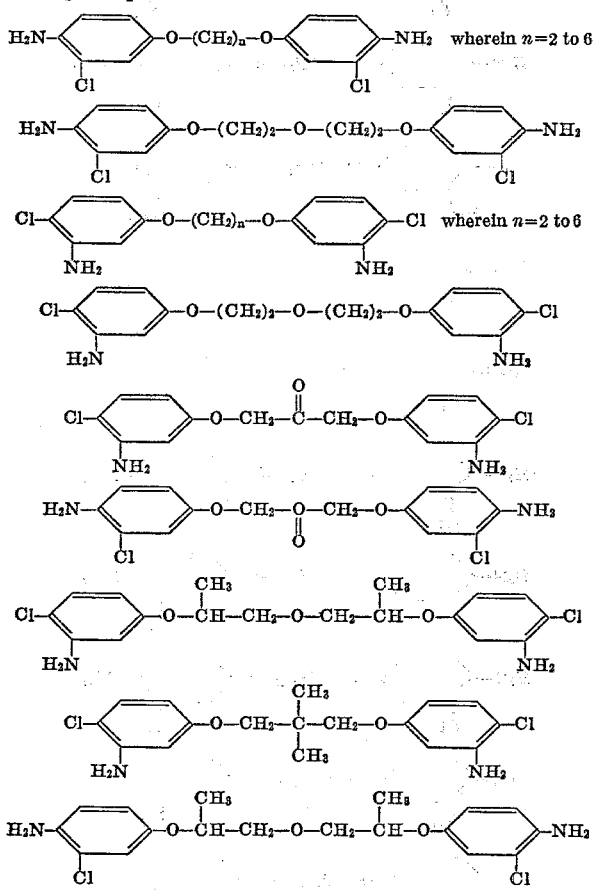

The compounds of this invention are prepared by generally known processes, such as, for example, by reacting nitrochlorophenols having the formula:

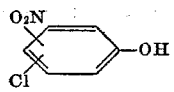

wherein the nitro group and chlorine atom are in the o-position with respect to one another, with dihalogenated compounds having the formula:

Hal—A—Hal wherein Hal is a halogen atom, such as, for example, chlorine, bromine or iodine and A is an optionally branched carbon chain containing from 2 to 12 carbon atoms and which may be interrupted by hetero atoms, preferably by oxygen or sulphur atoms, or may contain carbonyl or thiocarbonyl groups or may also contain sulphoxide, sulphone or

groups wherein R is an alkyl radical having from 1 to 4 carbon atoms.

As examples of particularly suitable nitrochlorophenols there may be mentioned 3-chloro-4-nitrophenol and 4-chloro-3-nitrophenol, but 2-chloro-3-nitrophenol and 2-nitro-3-chlorophenol may also be used. As examples of suitable dihalo compounds there may be mentioned, for example, 1,2-dichloroethane, 1,2-dibromoethane, 1,4-dichlorobutane, 1,5-dichloropentane, 1,6-dichlorohexane, 1,8-dichlorooctane, 1,9-dichlorononane, 1,10-dichlorodecane and 1,12-dichlorododecane, branched dihaloalkanes such as 1,2-dichloropropane, 1,2-dibromopropane, 1,2-diiodopropane, 1,3-dichloro-2,2-dimethylpropane, 2,2′-dichlorodiethyl ether, 2,2′-dibromodiethyl ether, 2,2′-dichlorodiethyl sulphide, 2,2′-dichlorodiethyl sulphone, N-methyl-bis-(β-chloroethyl)-amine, bis-(β-chloroisopropyl)ether, 1,3-dichloropropane-2-thione, dichloroacetone and the like.

The reaction of chloronitrophenols with the dihalo compounds is generally carried out in a solvent, for example, in dimethylsulphoxide, dimethylformamide, ethylene glycol and the like, generally in the presence of basic compounds, such as, for example, pyridine, quinoline, potassium hydroxide, potassium carbonate, sodium hydroxide and the like, preferably while using an inert gas as a protective medium, such as, for example, nitrogen, at elevated temperatures, generally within the range of from about 100° C. to about 180° C., for example.

The reaction products are dinitro compounds of the general formula:

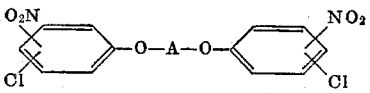

wherein A has the meaning previously set forth above. These dinitro compounds are then hydrogenated to the corresponding diamines of the invention. Hydrogenation is carried out in generally known manner, such as, for example, in the presence of hydrogenation catalysts, such as platinum, or Raney nickel and the like, preferably in the presence of a suitable solvent, such as methanol, ethanol, dioxane or the like, at room or elevated temperature.

The diamine compounds of this invention are substances which are generally highly crystalline and may be used, for example, as starting materials in the production of dyes and plant protective agents.

The diamine compounds of this invention are particularly suitable, however, for use as chain lengthening agents in the production of polyurethane elastomers. It has been found that elastomeric polyurethanes produced when employing the diamine compounds of the invention have considerably improved tensile strengths and permanent elongations for a given hardness when compared to polyurethane elastomers which have been produced, for example, with the use of the known chain lengthening agent 3,3′-dichloro-4,4′-diaminodiphenylmethane. The elastomers produced by this invention are characterized particularly in their greatly increased elasticity.

The present invention thus also relates to a process for the production of polyurethane elastomers from organic compounds which contain at least two hydroxyl groups and have a molecular weight of from about 800 to about 5000, organic diisocyanates and aromatic diamines as chain lengthening agents wherein diamines having the formula:

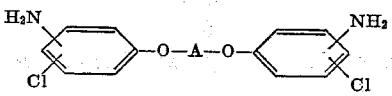

wherein the amino groups and chlorine atoms are in the o-position with respect to one another and A is an optionally branched carbon chain containing from 2 to 12 carbon atoms and with the proviso that the carbon chain may be interrupted by hetero atoms, are used as the diamine chain lengthening agents.

Diamines having the following formula:

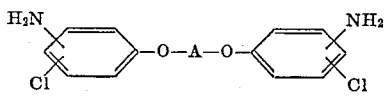

wherein A is an optionally branched carbon chain containing from 2 to 8 carbon atoms and which may be interrupted by hetero atoms or which contains carbonyl or thiocarbonyl groups, and particularly those diamines of the above-mentioned formula in which A is an optionally branched carbon chain containing from 2 to 8 carbon atoms and which may be interrupted by oxygen atoms or —SO—, —SO$_2$— or

groups wherein R is an alkyl radical having from 1 to 4 carbon atoms, or contains CO and/or CS groups, preferably CO groups, are particularly preferred as chain lengthening agents.

As examples of specific diamines particularly advantageous as chain lengthening agents according to this invention there may be mentioned, for example, the following compounds:

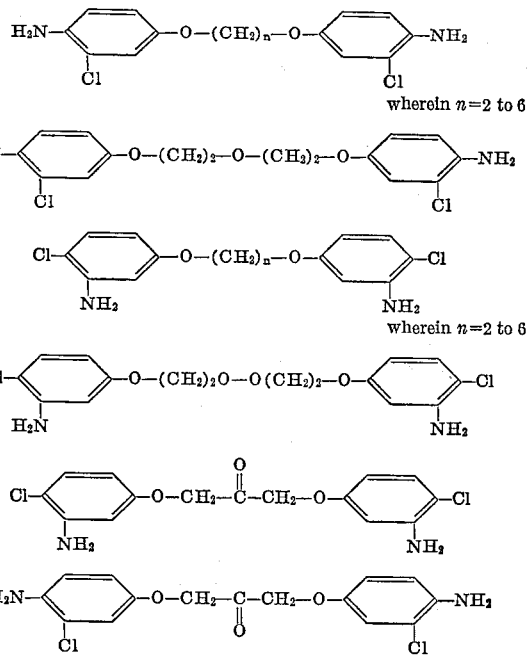

Suitable starting materials for the production of elastomeric polyurethanes according to this invention include those organic compounds which contain at least two hydroxyl groups and have a molecular weight of from about 800 to about 5000, preferably a molecular weight of from about 1000 to about 3000.

Any suitable hydroxyl polyester may be used such as linear or slightly branched polyesters obtained, for example, from oxycarboxylic or carboxylic acids and mono- or polyhydric alcohols optionally with aminoalcohols, diamines, oxyamines and diamino alcohols. Any suitable polycarboxylic acid may be used such as, for example, oxalic acid, malonic acid, succinic acid, glutaric acid, adipic acid, pimelic acid, suberic acid, azelaic acid, brassylic acid, sebacic acid, thapsic acid, maleic acid, fumaric acid, glutaconic acid, diethylsuccinic acid, isophthalic acid, terephthalic acid, 1,4-cyclohexanedicarboxylic acid, and the like as well as hydroxy carboxylic acids. Any suitable polycarboxylic acid may be used such as, for example ox- alic acid malonic acid, succinic acid, glutaric acid, adipic ethylene glycol, 1,3-propylene glycol, 1,2-butylene glycol, 1,2-propylene glycol, 1,4-butylene glycol, 1,3-butylene gylcol, 1-5-pentane diol, 1,4-pentane diol, 1,3-pentane diol, 1,6-hexane diol, 1,7-heptane diol and the like. The polyesters may contain double or triple bonds in unsaturated fatty acid moieties.

Any suitable linear or slightly branched polyether, such as, a polyhydric polyalkylene ether may be used such as, for example, the condensation product of an alkylene oxide optionally with any suitable initiator. The initiator may be difunctional compounds including water so that the resulting polyether is essentially a chain of repeating alkylene oxy groups as in polyethylene ether glycol, polypropylene polybutylene ether glycol and the like; or the initiator may be any suitable active hydrogen containing compound which may be a monomer or even a compound having a relatively high molecular weight including other active hydrogen containing compounds as disclosed above. It is preferred that the initiator have from 2 to 8 active sites to which the alkylene oxides may add including, for example, amines, polyfunctional alcohols, aminoalcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Copolymers of this type may also be used. Any suitable initiator may be used including, for example, water, polyhydric alcohols, preferably having 2 to 8 hydroxyl groups, aminoalcohols, amines preferably having 2 to 8 replaceable hydrogen atoms bonded to nitrogen atoms. Phosphorous acids may also be used, but the phosphorous compounds are somewhat peculiar in that a different mode of preparation may be required, as more particularly set forth below. The resulting polyhydric polyalkylene ethers with the various bases of nitrogen, phosphorous and the like may have either primary or secondary hydroxyl groups or mixtures of primary and secondary hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Pats. 1,922,459, 3,009,939 and 3,061,625 or by the process disclosed by Wurtz in 1859 and in Encyclopedia or Chemical Technology, volume 7, pages 257 to 262, published by Interscience Publishers, Inc. (1951).

Specific examples of initiators are water, ethylene glycol, 1,2-propylene glycol, hexane-1,6-diol, ammonia, ethanolamine, tripropanolamine, diethanolpropanolamine, tributanolamine, 2,4-tolylene diamine, 4,4'-diphenylmethane diamine, p,p',p''-triphenylmethane triamine, ethylene diamine, propylene diamine, propylene triamine, N,N,N',N'-tetrakis-(2-hydroxypropyl) ethylene diamine, diethylene triamine and the like. A proportion of a trifunctional starting component, such as trimethylolpropane, glycerol, sorbitol or cane sugar may also be optionally used. It is, of course, also possible to use mixtures of linear and/or slightly branched polyalkylene glycol ethers of different types.

Any suitable polyhydric polythioether may be used such as, for example, the condensation product of thiodiglycol or the reaction product of a polyhydric alcohol such as is disclosed above for the preparation of the hydroxyl polyesters with any other suitable thioetherglycol. Other suitable polyhydric polythioethers are disclosed in U.S. Pats. 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acid set forth above or they may be made using the same components that make up the hydroxyl polyester with only a portion of the components being a diamine such as ethylene diamine and the like.

Any suitable polyacetal may be used such as, for example, the reaction product of formaldehyde or other suitable aldehyde with a polyhydric alcohol such as those disclosed above for use in the preparation of the hydroxyl polyesters. Also, any suitable polycarbonates may be employed if desired. It is also possible to employ mixtures of various organic compounds having at least two hydroxyl groups and a molecular weight of from about 800 to about 5000.

Any suitable organic diisocyanate may be used in the process of the present invention including aromatic, aliphatic and heterocyclic diisocyanates. In other words, two isocyanate radicals may be bonded to any suitable divalent organic radical to produce the organic diisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2-diisocyanate, 1,4-butane diisocyanate, 1,6-hexane diisocyanate, 1,8-octamethylene diisocyanate, cyclohexylene-1,2-diisocyanate, m-phenylene diisocyanate, 2,4-toluylene diisocyanate, 2,6-toluylene dissocyanate, 3,3'-dimethyl-4,4' - biphenylene diisocyanate, 3,3' - dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, furfurylidene diisocyanate and the like.

Examples of preferred diisocyanates include aliphatic dissocyanates, having the general formula $$OCN-(CH_2)_n-NCO$$

wherein $n$ represents a number from 2 to 8; cycloaliphatic diisocyanates, such as hexahydrotolylene-2,4- and 2,6-diisocyanate and mixtures of these isomers, 4,4'-dicyclohexyl methane diisocyanate, 1,4-diisocyanato cyclohexane, 1,3-diisocyanato cyclohexane, araliphatic diisocyanates such as 1,3- and 1,4-xylylene diisocyanate, and aromatic diisocyanates such as tolylene-2,4 or 2,6-diisocyanate and mixtures of these isomers such as a mixture of 80% 2,4-toluylene diisocyanate and 20% 2,6-toluylene diisocyanate, phenylene-1,4-diisocyanate, phenylene-1,3-diisocyanate, diphenylmethane-4,4'-diisocyanate, diphenyl ether 4,4'-diisocyanate, naphthylene-1,5-diisocyanate and the like. Isophorone diisocyanate and ester diisocyanates of carboxylic acids of the kind described, for example, in British patent specifications No. 965,474 and 1,072,956 may also be used as diisocyanates in accordance with the invention. Proportions of triisocyanates such as, benzene-1,3,5-triisocyanate or p,p',p"-triphenyl methane trisocyanate and the like may be used. Most preferred isocyanates are 2,4- and 2,6-tolylylene diisocyanate and isomeric mixtures thereof, diphenylmethane-4,4'-diisocyanate and naphthylene-1,5-diisocyanate.

Generally, the quantities in which the reactants are used are selected in such a way that the molar ratio of diisocyanate to chain extender plus the compound containing reactive hydroxyl groups, which is governed by the particular processing method used, is generally from 1.0 to 1.5 and preferably from 1.05 to 1.25.

The molar ratio of $NH_2$-groups in the chain-extender to reactive OH groups may vary within wide limits, although it is preferably from 0.4 to 1.5, producing soft to hard types of polyurethanes.

The process according to this invention may be carried out in many suitable and different ways. For example, the compound containing at least two hydroxyl groups may be reacted with an excess of diisocyanate and, after the diamine chain-extender of the invention has been added, the resulting melt is poured into molds. After heating for several hours, a high grade elastic polyurethane plastic is obtained.

In another embodiment, the fairly high molecular weight compound containing at least two hydroxyl groups, in admixture with the diamine chain-extender of the invention, is reacted with an excess of diisocyanate, and the reaction product is molded under heat and pressure after it has been granulated. Depending upon the quantities in which the reactants are used, it is possible in this way to obtain polyurethane plastics with different degrees of hardness and elasticity. In this way, it is possible to obtain plastics which can be processed like thermoplasts. In yet another embodiment, the relatively high molecular weight compound containing at least two hydroxyl groups, in admixture with the diamine chain extender of the invention, is reacted with a less than equivalent amount of diisocyanate, resulting in the formation of a millable sheet which may be converted in a subsequent stage, for example, by cross-linking with more diisocyanate, into an elastomeric polyurethane plastic.

The elastomeric polyurethanes obtained according to the invention are particularly valuable when the commercially available isomer mixture of 80% by weight of 2,4- and 20% by weight of 2,6-tolylene diisocyanate is used as the diisocyanate.

The products according to the invention may be used for a variety of purposes including, for example, the production of moldings of the kind used in machine or vehicle construction, for example, in the manufacture of gear rings, V-belts, drive belts, gear wheels, bearing shells, socket joints, seals, diaphragms and the like. The polyurethanes may be modified with the usual additives, for example, dyes, pigments or fillers if desired.

The invention is further illustrated but is not intended to be limited by the following examples in which all parts and percentages are by weight unless otherwise specified.

EXAMPLE 1

1,2-bis-(3-chloro-4-aminophenoxy)-ethane

About 347 parts (about 2 mol) of 3-chloro-4-nitrophenyl, about 188 parts (about 1 mol) of 1,2-dibromoethane and about 140 parts (about 2.5 mol) of KOH in about 600 parts by volume of ethylene glycol are heated to about 150° C. in the course of about 2 hours and then kept at this temperature for about a further 1½ hours. The reaction mixture is then poured onto ice and the precipitate which is formed is filtered with suction and washed with dilute NaOH and water until the filtrate is colorless. After recrystallization from glacial acetic acid/dioxane (2:1), about 258 parts (about 69.5% of the theoretical) of 1,2-bis(3-chloro-4-nitrophenoxy) - ethane are obtained. Melting point: 163° C. to 165° C.

The nitro compound is catalytically hydrogenated in about 1.31 parts of ethanol with about 50 parts of Raney nickel in the presence of 40 parts of $NaHCO_3$ and yields about 195 parts (about 90% of the theoretical) of the diamine. Melting point: 113° C. to 115° C.

*Analysis.*—Found (percent): Cl, 22.3; N, 9.1. Calculated (percent): Cl, 22.6; N, 8.9.

The following compounds are prepared in a manner analogous to Example 1:

EXAMPLE 2

1,4-bis-(3-chloro-4-aminophenoxy)-butane

Melting point: 94° C. to 96° C.
*Analysis.*—Found (percent): C, 56.5; H, 5.4; N, 8.3. Calculated (percent): C, 56.3; H, 5.27; N, 8.22.
Melting point of the nitro compound: 133° C.

EXAMPLE 3

1,6-bis-(3-chloro-4-aminophenoxy)-hexane

Melting point: 85° C. to 86° C.
*Analysis.*—Found (percent): Cl, 19.15; N, 7.5. Calculated (percent): Cl, 19.25; N, 7.58.
Melting point of the nitro compound: 86° C. to 88° C.

EXAMPLE 4

4,4'-bis-(3-chloro-4-aminophenoxy)-di-n-butyl ether

Melting point: 73° C. to 74° C.
Analysis.—Found (percent): Cl, 17.0; N, 6.55. Calculated (percent): Cl, 17.2; N, 6.77.
Melting point of the nitro compound: 61° C. to 62° C.

EXAMPLE 5

2,2'-bis-(3-chloro-4-aminophenoxy)-diethyl ether

Melting point: 105° C.
Analysis.—Found (percent): C, 53.8; H, 5.3; Cl, 19.85. Calculated: (percent): C, 53.8; H, 5.04; Cl, 19.9.
Melting point of the nitro compound: 98° C. to 100° C.

EXAMPLE 6

1,2-bis-(4-chloro-3-aminophenoxy)-ethane

Melting point: 166° C. to 168° C.
Analysis.—Found (percent): C, 54.1; H, 4.8; N, 8.9; Cl, 22.3. Calculated (percent): C, 53.7; H, 4.5; N, 9.0; Cl, 22.6.
Melting point of the nitro compound: 174° C. to 176° C.

EXAMPLE 7

4,4'-bis-(4-chloro-3-aminophenoxy)-butane

Melting point: 149° C. to 151° C.
Analysis.—Found (percent): C, 56.3; H, 5.2; N, 8.5; Cl, 20.5. Calculated (percent): C, 56.5; H, 5.4; N, 8.3; Cl, 20.8.
Melting point of the nitro compound: 132° C. to 134° C.

EXAMPLE 8

2,2'bis-(4-chloro-3-aminophenoxy)-diethyl ether

Melting point: 114° C. to 116° C.
Analysis.—Found (percent): C, 54.0; H, 5.3; N, 7.8; Cl, 19.3. Calculated (percent): C, 53.8; H, 5.0; N, 7.9; Cl, 19.8.
Melting point of the nitro compound: 110° C. to 112° C.

EXAMPLE 9

2,2'-bis-(3-chloro-4-nitrophenoxy)-diethylcarbonate

About 1050 parts of 3-chloro-4-nitrophenol (about 6 mol) and about 430 parts (about 7 mol) of KOH are dissolved in about 2 liters of ethylene glycol. About 564 parts (about 7 mol) of ethylene chlorohydrin are introduced in the course of about 30 minutes at about 50° C. to 70° C., and the reaction mixture is then heated for about 2 hours at about 80° C. and for about 3 hours at about 120° C. The reaction mixture is then poured onto ice and the precipitate formed is removed by suction filtration and washed with water. After recrystallization from water/methanol, about 894 parts (about 69% of the theoretical) of ethylene glycol-mono-(3-chloro-4-nitrophenyl ether) are obtained. Melting point: 73° C. to 74° C.

About 288 parts of the nitro compound (about 1.324 mol) and about 142 parts of diphenylcarbonate (about 0.662 mol) are reacted to give rise to ester interchange at about 150° C. to 200° C. under about 12 mm. Hg, the phenol being removed by distillation, and, after reprecipitation with methanol from dioxane, about 256 parts (about 90% of the theoretical) of 2,2'-bis-(3-chloro-4-nitrophenoxy)-diethylcarbonate are obtained. Melting point: 89° C. to 91° C.
Analysis.—Found (percent): C, 45.15; H, 3.45; Cl, 14.95. Calculated (percent): C, 45.0; H, 3.0; Cl, 15.0.

The nitro compound is catalytically hydrogenated with about 40 parts of Raney nickel and about 1.3 parts of KSCN in 1 liter of methanol and yields about 190 parts (about 87% of the theoretical) of the diamine. Melting point: 170° C. (decomposition).
Analysis.—Found (percent): C, 50.7; H, 4.6; Cl, 17.4. Calculated (percent): C, 50.8; H, 4.5; Cl, 17.7.

EXAMPLE 10

1-(3-chloro-4-aminophenoxy)-2-(4-chloro-3-aminophenoxy)-ethane 1-chloro-2-(3 - chloro-4-nitrophenoxy)-ethane (boiling point 156° C. to 159° C./0.15 mm. Hg) is obtained in about 95% yield by the action of thionyl chloride on ethylene glycol-mono-(3-chloro-4-nitrophenyl ether); see Example 9.

1-(3 - chloro - 4 - nitrophenoxy)-2-(4-chloro-3-nitrophenoxy)-ethane (melting point 103° C. to 105° C.) is obtained from 1 - chloro - 2 - (3-chloro-4-nitrophenoxy)-ethane in a manner analogous to Example 1.

The diamino compound is obtained by catalytic reduction with Raney nickel/potassium thiocyanate. Melting point: 146° C. to 147° C.
Analysis.—Found (percent): C, 53.7; H, 4.5; N, 9.0; Cl, 22.6. Calculated (percent): C, 53.9; H, 4.6; N, 9.1; Cl, 22.3.

EXAMPLE 11

About 200 parts of a polyester (OH number 56) obtained from adipic acid and ethylene glycol are dehydrated in vacuo at about 130° C. and about 29.2 parts of an isomeric mixture of about 80% of 2,4- and about 20% of 2,6-toluylene diisocyanate are added at a temperature of about 120° C. The reaction mixture is then stirred for about 30 minutes at about 120° C., placed under a vacuum for about 30 seconds, and about 15.7 parts of the diamine of Example 1, in the molten state, is introduced with stirring. After about 20 seconds, the liquid reaction mixture is poured into preheated molds where it solidifies within a few minutes. After about 24 hours heating at about 100° C., a polyurethane elastomer which has the following properties is obtained:

Tensile strength (DIN 53504) _____kg./cm.$^2$__ 277
Elongation at break (DIN 53504) _____percent__ 640
Permanent elongation 1 minute after tearing _do____ 8
Dimensional stability _____kg. wt. __ 53
Shore hardness A (DIN 53505) _____ 84
Elasticity (DIN 53512) _____percent__ 45

COMPARISON EXAMPLE

The process is carried out in a manner analogous to Example 10 but about 13.5 parts of 3,3'-dichloro-4,4'-diaminodiphenylmethane is used as the chain lengthening agent instead of 15.7 parts of the diamine of Example 1.

The polyurethane elastomer obtained has the following properties:

Tensile strength (DIN 53504) _____kg./cm.$^2$__ 280
Elongation at break (DIN 53504) _____percent__ 628
Permanent elongation 1 minute after tearing _do____ 4
Dimensional stability _____kg. wt.___ 38
Shore hardness A (DIN 53505) _____ 77
Elasticity (DIN 53512) _____percent__ 40

If a polyurethane elastomer which has the same Shore hardness A as the polyurethane elastomer of Example 10 is produced for comparison, then about 40 parts 2,4-toluylene diisocyanate and about 27 parts of 3,3-dichloro-4,4'-diaminodiphenylmethane should be used with otherwise the same ingredients. The elastomer is found to have the following properties:

Tensile strength (DIN 53504) _____kg./cm.$^2$__ 234
Elongation at break (DIN 53504) _____percent__ 440
Permanent elongation 1 minute after tearing _do____ 11
Dimensional stability _____kg. wt.___ 37
Shore hardness A (DIN 53505) _____ 84
Elasticity (DIN 53512) _____percent__ 31

EXAMPLE 12

About 200 parts of a polybutylene glycol (OH number 53.5) are dehydrated under a vacuum of about 130° C. for about 15 minutes. About 27.7 parts of an isomeric mixture of about 80% of 2,4- and about 20% of 2,6-toluylene diisocyanate are added at about 110° C. After about 30 minutes, about 40.9 parts of the compound of Example 1 are added in the molten state. After about 20 seconds the homogeneous melt is poured into molds. After about 24 hours' heating at about 100° C., a polyurethane which has the following properties is obtained:

Tensile strength (DIN 53504) _____kg./cm.$^2$__ 158
Elongation at break (DIN 53504) _____percent__ 583
Dimensional stability _____kg. wt.__ 31
Shore hardness A (DIN 53505) _____ 83
Elasticity (DIN 53512) _____percent__ 61

EXAMPLE 13

About 200 parts of a polypropylene glycol (OH number 56) are dehydrated at about 130° C. under a vacuum for about 15 minutes. About 33.8 parts of an isomeric mixture of about 80% of 2,4- and about 20% of 2,6-toluylene diisocyanate are added at about 130° C. After about 40 minutes, about 21.9 parts of the diamine of Example 1 are added in the form of a melt. After about 20 seconds, the homogeneous melt is poured into preheated molds and after-heated at about 100° C. for about 24 hours.

The resulting polyurethane elastomer has the following properties:

Tensile strength (DIN 53504) _____kg./cm.$^2$__ 60
Elongation at break (DIN 53504) _____ percent__ 140
Permanent elongation 1 min. after tearing ___do____ 3
Dimensional stability _____kg. wt.__ 27
Shore hardness A (DIN 53505) _____ 89
Elasticity (DIN 53512) _____percent__ 56

EXAMPLE 14

About 200 parts of a polyester (OH number 56) obtained from adipic acid and ethylene glycol are dehydrated under a vacuum at about 130° C. About 38.6 parts of hexamethylene diisocyanate are added at about 130° C. After about 30 minutes the reaction mixture is cooled to about 120° C. and a melt of about 31.3 parts of the diamine of Example 1 is added. After about 20 seconds, the melt is poured into molds and after-heated at about 100° C. for about 24 hours.

The resulting polyurethane elastomer has the following properties:

Tensile strength (DIN 53504) _____kg./cm.$^2$__ 282
Elongation at break (DIN 53504) _____percent__ 595
Permanent elongation 1 min. after tearing ___do____ 17
Dimensional stability _____kg. wt.__ 51
Shore hardness A (DIN 53505) _____ 88
Elasticity (DIN 53512) _____percent__ 46

EXAMPLE 15

Preceeding as in Example 11, and using about 200 parts of a polyester of adipic acid and ethylene glycol (OH number 56), about 40 parts of a mixture of about 80% of 2,4- and about 20% of 2,6-toluylene diisocyanate and about 31.3 parts of the diamine of Example 6 in the form of a melt, a polyurethane which has the following properties is obtained:

Tensile strength (DIN 53504) _____kg./cm.$^2$__ 382
Elongation at break (DIN 53504) _____percent__ 653
Permanent elongation 1 min. after tearing __do____ 3
Dimensional stability _____kg. wt.__ 46
Shore hardness A (DIN 53505) _____ 75
Elasticity (DIN 53512) _____percent__ 23

EXAMPLE 16

Proceeding as in Example 11 and using about 200 parts of a polytetramethylene glycol ether (OH number 53.5), about 38.3 parts of a mixture of about 80% of 2,4- and about 20% of 2,6-toluylene diisocyanate and about 31.3 parts of the compound of Example 6 in the form of a melt, a polyurethane of the following properties is obtained:

Tensile strength (DIN 53505) _____kg./cm.$^2$__ 80
Elongation at break (DIN 53505) _____percent__ 423
Permanent elongation 1 min. after tearing __do____ 7
Dimensional stability _____kg. wt.__ 18
Shore hardness A (DIN 53505) _____ 75
Elasticity (DIN 53512) _____percent__ 45

EXAMPLE 17

Proceeding as in Example 11 and using about 200 parts of a polyester of adipic acid and ethylene glycol (OH number 56), about 32.5 parts of a mixture of about 80% of 2,4- and about 20% of 2,6-toluylene disocyanate and about 23.8 parts of the compound according to Example 2 in the form of a melt, a polyurethane which has the following properties is obtained:

Tensile strength (DIN 53504) _____kg./cm.$^2$__ 244
Elongation at break (DIN 53504) _____percent__ 558
Permanent elongation 1 min. after tearing __do____ 6
Dimensional stability _____kg. wt.__ 56
Shore hardness A (DIN 53505) _____ 87
Elasticity (DIN 53512) _____percent__ 38

EXAMPLE 18

Proceeding as described in Example 12 and using about 200 parts of a polytetramethylene glycol (OH number 53.5), about 27.7 parts of an isomeric mixture of about 80% of 2,4- and 20% of 2,6-toluylene diisocyanate and about 17.1 parts of the compound according to Example 2 in the form of a melt, a polyurethane which has the following properties is obtained:

Tensile strength (DIN 53505) _____kg./cm.$^2$__ 94
Elongation at break (DIN 53505) _____percent__ 575
Permanent elongation 1 min. after tearing __do____ 14
Dimensional stability _____kg. wt.__ 17
Shore hardness A (DIN 53505) _____ 77
Elasticity (DIN 53512) _____percent__ 52

EXAMPLE 19

Proceeding as in Example 11 and using about 200 parts of a polyester of adipic acid and ethylene glycol (OH number 56), about 33.1 parts of a mixture of about 80% of 2,4- and about 20% of 2,6-toluylene diisocyanate and about 24.3 parts of the compound of Example 3 in the form of a melt, a polyurethane which has the following properties is obtained:

Tensile strength (DIN 53504) _____kg./cm.$^2$__ 254
Elongation at break (DIN 53504) _____percent__ 600
Permanent elongation 1 min. after tearing __do____ 8
Dimensional stability _____kg. wt.__ 50
Shore hardness A (DIN 53505) _____ 85
Elasticity (DIN 53512) _____percent__ 38

EXAMPLE 20

Proceeding as in Example 11 and using about 200 parts of a polyester of adipic acid and ethylene glycol (OH number 56), about 40 parts of a mixture of about 80%, of 2,4- and about 20% of 2,6-toluylene diisocyanate and about 34.1 parts of the compound of Example 7 in the form of a melt, a polyurethane which has the following properties is obtained:

Tensile strength (DIN 53504) _____kg./cm.² 241
Elongation at break (DIN 53504) _____percent 705
Permanent elongation 1 min. after tearing __do____ 8
Dimensional stability _____kg. wt 38
Shore hardness A (DIN 53505) _____ 60
Elasticity (DIN 53512) _____percent 17

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departng from the spirit and scope of the invention.

What is claimed is:

1. A polyurethane elastomer prepared by a process which comprises reacting an organic compound having at least two hydroxyl groups and a molecular weight of from about 800 to about 5000, an organic diisocyanate and an aromatic diamine chain lengthening agent wherein the diamine chain lengthening agent is a diamine having the formula:

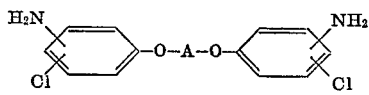

wherein the amino groups and chlorine atoms are in the o-position with respect to one another and A is a carbon chain containing from 2 to 12 carbon atoms with the proviso that the carbon chain may be interrupted by hetero atoms.

2. The product of claim 1 wherein the diamine chain lengthening agent is a diamine having the formula:

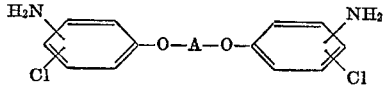

wherein the amino groups and chlorine atoms are in the o-position with respect to one another and A is a carbon chain containing from 2 to 8 carbon atoms with the proviso that the carbon chain may be interrupted by hetero atoms.

3. The product of claim 1 wherein the diamine chain lengthening agent is a diamine having the formula:

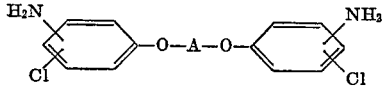

wherein A is a carbon chain containing from 2 to 8 carbon atoms with the proviso that the carbon chain may be interrupted by a member selected from the group consisting of oxygen, sulphur, —SO—, —SO$_2$—, $$-\underset{\mathrm{R}}{\mathrm{N}}-$$

groups wherein R is an alkyl radical having from 1 to 4 carbon atoms, —CO— or —CS— groups.

4. The product of claim 1 wherein the diamine chain lengthening agent is a diamine having the formula:

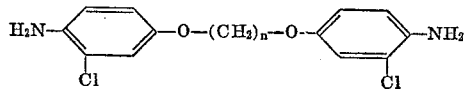

wherein $n$ is an integer of from 2 to 6.

5. The product of claim 1 wherein the diamine chain lengthening agent is a diamine having the formula:

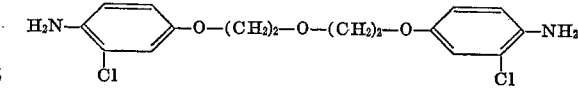

6. The product of claim 1 wherein the diamine chain lengthening agent is a diamine having the formula:

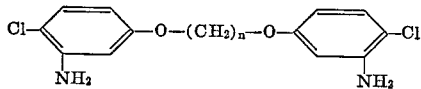

wherein $n$ is an integer of from 2 to 6.

7. The product of claim 1 wherein the diamine chain lengthening agent is a diamine having the formula:

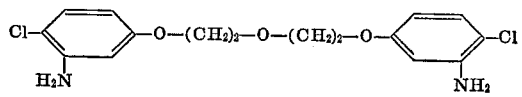

8. The product of claim 1 wherein the diamine chain lengthening agent is a diamine having the formula:

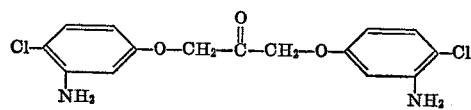

9. The product of claim 1 wherein the diamine chain lengthening agent is a diamine having the formula:

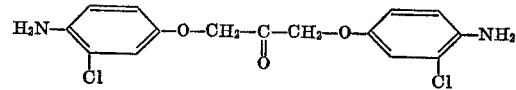

References Cited

UNITED STATES PATENTS 3,436,359   4/1969   Hubin et al. _____ 260—2
3,485,800  12/1969   Wieden et al. _____ 260—75
3,558,703   1/1971   Adam et al. _____ 260—563

DONALD E. CZAJA, Primary Examiner

H. S. COCKERAM, Assistant Examiner

U.S. Cl. X.R.

260—77.5 AM